(12) United States Patent
Elizondo (10) Patent No.: US 6,577,867 B1
(45) Date of Patent: Jun. 10, 2003

(54) METHOD FOR CONDUCTING HANDOFF BACK TO ANCHOR COMMUNICATION SCENARIOS

(75) Inventor: Alejandro A. Elizondo, Saltillo (MX)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/540,073

(22) Filed: Mar. 31, 2000

(51) Int. Cl.⁷ .................................................. H04Q 7/20
(52) U.S. Cl. ........................ 455/436; 455/439; 455/445
(58) Field of Search ................................. 455/405, 406, 455/422, 432, 433, 436, 438, 439, 449, 445, 560, 561; 379/115.01, 115.03, 121.04, 121.05, 127.03, 127.06, 211.02

(56) References Cited

U.S. PATENT DOCUMENTS

| 4,398,063 | A |   | 8/1983  | Hass et al. ................. 179/2 EB |
| 5,018,187 | A |   | 5/1991  | Marinho et al. .............. 379/60  |
| 5,444,773 | A |   | 8/1995  | Hirsohn et al. ............. 379/219  |
| 5,579,375 | A | * | 11/1996 | Ginter ......................... 455/433 |
| 5,796,790 | A | * | 8/1998  | Brunner ....................... 455/406 |
| 6,134,433 | A | * | 10/2000 | Joong et al. ........... 379/211.02 |
| 6,434,126 | B1 | * | 8/2002 | Park ............................. 455/445 |
| 6,442,388 | B1 | * | 8/2002 | Lopez et al. ................ 455/436 |

FOREIGN PATENT DOCUMENTS

| WO | WO 98/06226 | 2/1998  |
| WO | WO 98/10596 | 3/1998  |
| WO | WO 00/70899 | 11/2000 |

OTHER PUBLICATIONS

ANSI–41 Standard Telecommunications Industry Association Doc. No. 41.2–D, Jan. 31, 2000, Cellular Radiotelecommunications Intersystem Operations: Intersystem Handoff Information Flows.

* cited by examiner

Primary Examiner—Nay Maung
(74) Attorney, Agent, or Firm—Jenkens & Gilchrist, P.C.

(57) ABSTRACT

A method which supports Mobile Station (MS) handoff back operations across tandem switches makes use of a modification to the ANSI-41 Standard. The method includes the steps of determining that a handoff back call connection operation to a Target Mobile Switching Center (involved in the call path and not directly connected to the Serving Mobile Switching Center) should occur, verifying that the Target Mobile Switching Center (Target MSC) is also the Anchor MSC, verifying that a designated channel of the Target MSC is available to support the MS, and moving the MS directly to the designated channel. The address of the Anchor MSC is obtained using the MSCID contained within the BillingID parameter of a FacilitiesDirective message received by the tandem MSC directly connected to the serving MSC prior to initiating the handoff back operation. The method operates within a telecommunications network, including an MS served by a Serving MSC connected along a call path to one or more Tandem MSCs and the AMSC, and which is connected in series with the Tandem MSCs by one or more inter-MSC trunks. The handoff back call connection operation occurs directly from the SMSC to the AMSC and may even be used within networks which do not support path minimization operations.

23 Claims, 6 Drawing Sheets

METHOD FOR CONDUCTING HANDOFF BACK TO ANCHOR COMMUNICATION SCENARIOS

CROSS REFERENCE TO RELATED APPLICATIONS

This application is related to U.S. patent application Ser. No. 09/464,124, filed on Dec. 16, 1999, which is incorporated herein by reference in its entirety.

BACKGROUND OF THE INVENTION

1. Technical Field

This invention relates generally to mobile cellular telecommunications, and more particularly, to a method of utilizing existing signaling protocols, such as the American National Standards Institute (ANSI)-41 protocol, to implement more efficient handoff back operations.

2. History of Related Art

Within a telecommunications network that supports Mobile Station (MS) movement, several methods have been devised to transfer communications for active call connections maintained by any one MS as it moves away from one serving switch toward another. The ANSI-41D Standard includes several procedures and messages to implement such inter-system (inter-exchange) handoff forward operations (i.e., transferring the active call connection of a MS from the serving switch to a target switch which is not currently trunk-connected in the call), and handoff back operations (i.e., transferring the active call connection from the serving switch to a target switch which is already trunk-connected within the call path). While several scenarios are offered for conducting handoff forward operations with a tandem switch, only two scenarios are available when a handoff back operation must be accomplished. Further, the handoff back call connection operation is only valid for use when the target switch is connected directly to the serving switch (i.e., there is a direct trunk connection therebetween). Thus, for example, the handoff back message cannot be used to transfer a call connection directly from a serving Mobile Switching Center (MSC) to an anchor MSC using the anchor MSC as the target switch if there is a tandem MSC located along the call path between the anchor MSC and the serving MSC.

While it is possible to invoke the handoff back operation under such circumstances (i.e., where multiple switches are trunk-connected along a call path, and the target switch is not immediately trunk-connectable to the serving switch), the result may be that trunks between the various switches (connected before handoff) will not be released after the handoff operation occurs. Thus, network resources are wasted.

Another problem occurs when a HandoffToThird message (used as an alternative to the handoff back message) is received by a tandem switch which does not support a handoff operation with path minimization. The result is a RETURN ERROR or REJECT response sent back to the requesting switch. Alternatively, no response at all may be received by the requesting switch. When this occurs, the serving switch must send a FacilitiesDirective message back along the call path, past the tandem switch, so that the handoff can occur. However, once again, previously connected trunks along the call path may not be released, and network resources will be wasted.

Figure 1:
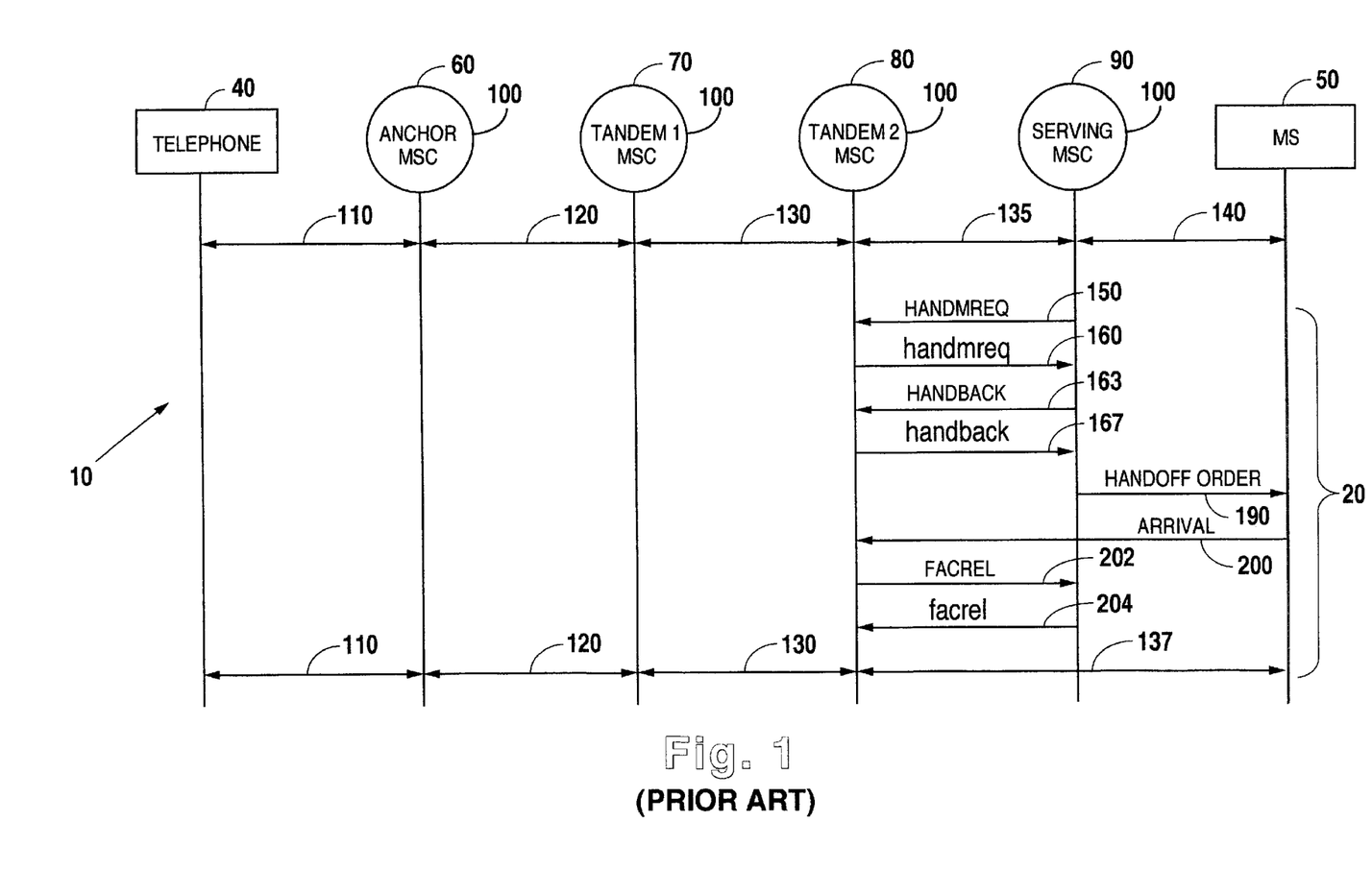
FIG. 1 (previously described) is a network signaling and nodal operation diagram illustrating basic prior art handoff back operations.

These scenarios are illustrated in FIGS. 1, 2, 3, and 4. FIG. 1 is a network signaling and nodal operation diagram illustrating basic prior art handoff back operations, wherein the telecommunications network 10 includes a telephone 40, an anchor MSC 60, a tandem1 MSC 70, a tandem2 MSC 80, a serving MSC 90, and a MS 50. There is an active call connection between the telephone 40 and MS 50, using a series of switches 100, which are connected by trunks 120, 130, and 135. The telephone 40 (which may be a wireline telephone or another MS) is connected to the switches by way of a residential line connection or wireless network interface 110, and the MS 50 is connected to the serving MSC using a wireless network interface 140.

If the serving MSC 90 operates to determine that a handoff operation to an adjacent candidate MSC, such as the tandem2 MSC 80, is appropriate, the serving MSC 90 sends a HandoffMeasurementRequest message 150 to the tandem2 MSC 80. In response, the candidate MSC 80 performs location measurements according to its internal programming algorithms, and returns the results to the serving MSC 90 in the form of a HandoffMeasurementRequest response 160. Based on the response 160 content, the serving MSC 90 determines that the call should be handed off to the tandem2 MSC 80, which is now also considered the target MSC 80. In this illustration, the serving MSC 90 has also determined that the tandem2 MSC 80 is already trunk-connected along the call path.

At this point, a HandoffBack message 163 is sent from the serving MSC 90 to the target MSC 80, which directs the target MSC 80 to initiate a handoff back task. If a voice channel on the target MSC 80 is available, a HandoffBack response 167 is returned to the serving MSC 90, which allows the handoff operation to proceed.

The serving MSC 90, upon receipt of the HandoffBack response 167, sends a Handoff Order message 190 to the served MS 50. This action directs the MS 50 to move to the available voice channel on the target MSC 80. Upon arrival 200 of the MS 50 on the voice channel of the target MSC 80, a FacilitiesRelease message 202 is sent from the target MSC 80 to the serving MSC 90. This indicates that the handoff operation has been successful and that the facilities used by the serving MSC 90 are no longer needed. The serving MSC 90, in turn, sends a FacilitiesRelease response 204 to the target MSC 80, releasing the trunk connection 135 and marking the inter-MSC trunk 135 as idle. The target MSC 80, in turn, marks the inter-MSC trunk 135 as idle and the handoff back process is complete. The resulting call connection between the telephone 40 and the MS 50 comprises the series of switches 100 connected by trunks 120 and 130. The telephone 40 is connected to the Anchor MSC 60 by way of line connection or wireless interface 110, and the MS 50 is connected to the new serving MSC 80 using the wireless network interface 137.

The scenario 20 just described, is a classic prior art handoff back operation from a serving switch 90 to a tandem switch 80, where the tandem switch 80 is trunk-connected to the serving switch 90 along the call path. In this scenario, the handoff back operation is directed toward the tandem2 MSC 80. However, the command operates in exactly the same manner if the Anchor MSC 60 is physically located in the place of the tandem2 MSC 80, such that the target switch 100 is the Anchor MSC 60, instead of the tandem2 MSC 80. As long as the handoff back is made to the immediately previous switch in the call path, no network resources are wasted, and the ANSI-41 protocol operation functions in an efficient manner.

Figure 2:
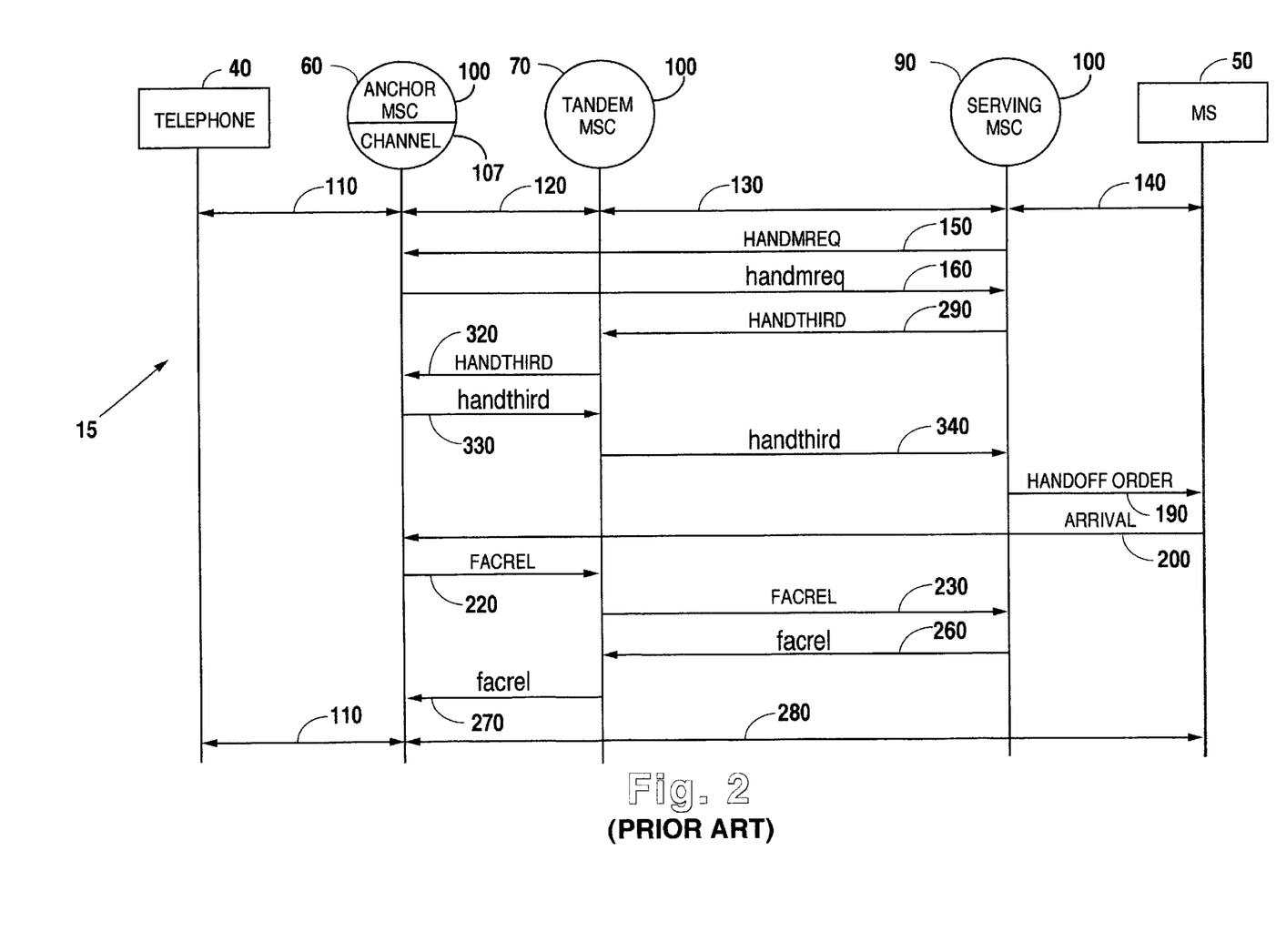
FIG. 2 (previously described) is a network signaling and nodal operation diagram illustrating prior art handoff operations used in a network that supports path minimization.

A successful sequence of handoff operations in the prior art can also be seen in the network signaling and nodal operation diagram of FIG. 2. In this case, a successful handoff back with tandem using the HandoffToThird message and path minimization are shown within a telecommunications network 15 including a telephone 40, an anchor MSC 60, a tandem MSC 70, a serving MSC 90, and a MS 50 are shown. There is an active call connection between the telephone 40 and MS 50, using switches 60, 70, and 90, which are connected by trunks 120 and 130. The telephone 40 (which may be a wireline telephone or another MS) is connected to the switches 60, 70, and 90 by way of a residential line connection or wireless network interface 110, and the MS 50 is connected to the serving MSC using a wireless network interface 140.

If the serving MSC 90 operates to determine that a handoff operation to a nearby candidate MSC, such as the anchor MSC 60, is appropriate, the serving MSC 90 may send a HandoffMeasurementRequest message 150 to the anchor MSC 60. In response, the anchor MSC 60 performs location measurements according to its internal programming algorithms, and returns the results to the serving MSC 90 in the form of a HandoffMeasurementRequest response 160. Based on the response 160 content, the serving MSC 90 determines that the call should be handed off to the anchor MSC 60, which is now also considered the target MSC 60. The anchor MSC 60 will be directed to receive the MS 50 using the handoff back call connection with path minimization operation, and the MS 50 will be moved to the designated channel 107 of the anchor MSC 60. Directing the anchor MSC 60 to receive the MS 50 involves sending a HandoffToThird message 290 from the serving MSC 90 to the tandem MSC 70, which in turn directs the tandem MSC 70 to perform an intersystem handoff task with path minimization; sending a HandoffToThird message 320 from the tandem MSC 70 to the anchor MSC 60, which results in directing the anchor MSC 60 to perform path minimization and verifies that the designated channel 107 of the anchor MSC 60 is available to support the MS 50; and sending a HandoffToThird response along the call path from the anchor MSC 60 to the serving MSC 90 (steps 330 and 340).

Moving the MS 50 to the designated channel 107 of the anchor MSC 60 requires sending a Mobile Handoff Order 190 from the serving MSC 90 to the MS 50 and receiving the MS 50 on the designated channel 107 at arrival step 200. Directing the tandem MSC 70 and serving MSC 90 to release the first and second inter-MSC trunks 120 and 130, and marking the first and second inter-MSC trunks 120 and 130 as idle requires sending a FacilitiesRelease message along the call path from the anchor MSC 60 to the serving MSC 90 (i.e., steps 220 and 230), sending a FacilitiesRelease response 260 along the call path from the serving MSC 90 to the tandem MSC 70, and sending a FacilitiesRelease response 270 along the call path from the tandem MSC 70 to the anchor MSC 60.

At this point, the call path between the telephone 40 and the MS 50. includes only the telephone line or wireless network interface 110, the anchor MSC 60, and the wireless network interface 280 No unused inter-MSC trunks 120, 130 are left connected, and network resources are conserved. However, as noted above, the intersystem handoff task can not be accomplished by simply sending a handoff back or HandoffToThird message directly from the serving MSC 90 to the Anchor MSC 60, which is also the Target MSC 60. This is because the MSCID (MSC IDentification number) for the Anchor MSC 60 is only known to the Tandem MSC 70, and not to the Serving MSC 90. Conventional ANSI-41D protocol operations do not explicitly forward the MSCID parameter for all of the switches in a call path, but only for that switch that hands a call connection forward to another switch (to be connected) in the call path. Thus, each switch connected in a call path is only able to reference the MSCID for the immediately previous, and immediately following, switch in the path.

Figure 3:
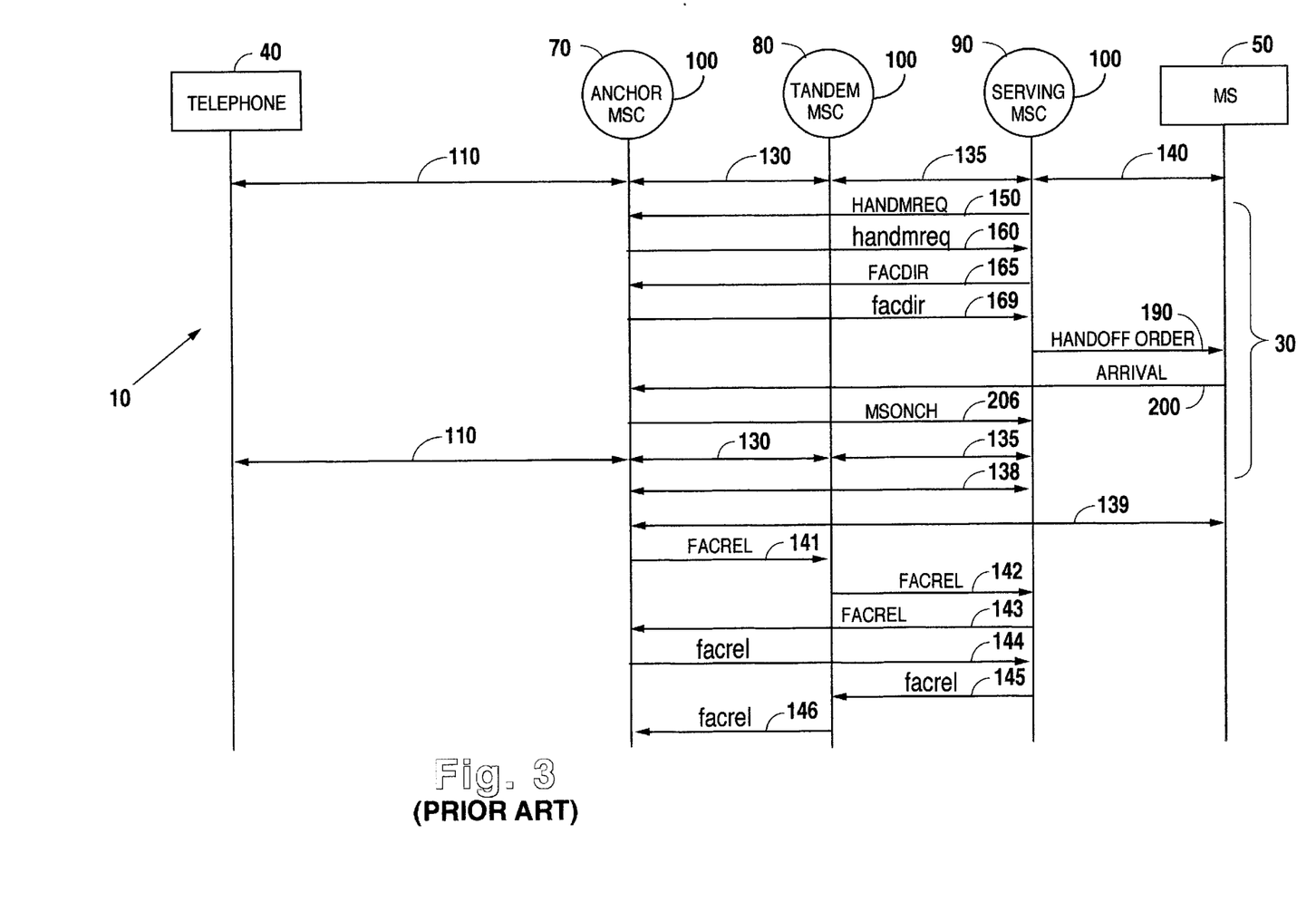
FIG. 3 (previously described) is a network signaling and nodal operation diagram illustrating prior art handoff back operations without path minimization.

Turning now to scenario 30 of FIG. 3, the prior art handoff back operation to a switch 100 (i.e., anchor MSC 70) which is in the call path, but is not directly trunk-connected to the serving MSC 90 and does not support path minimization, is illustrated. In this case, as will be described, a handoff back operation using the Facilities Directive message results in a lengthy series of message transactions, wasting network resources.

In this case, an active call connection between the telephone 40 and the Mobile Station 50 exists, making use of trunk connections 130 and 135. A HandoffMeasurementRequest message 150 is sent from the serving MSC 90 to the Anchor MSC 70. The HandoffMeasurementRequest response 160 is returned to the serving MSC 90, where it is determined that a handoff back operation from the serving MSC 90 to the Target MSC 70, which is also the Anchor MSC 70, is desirable.

A FacilitiesDirective message 165 is then sent from the serving MSC 90 to the Anchor MSC 70, which results in a FacilitiesDirective response 169 from the Anchor MSC 70 to the serving MSC 90. The Handoff Order 190 is sent to MS 50, and the MS 50 arrives 200 on the available channel of the Anchor MSC 70. The Anchor MSC 70 sends a Mobile Station On Channel message 206 to the initiator of the handoff back task (i.e., the serving MSC 90), informing the serving MSC 90 that the Anchor MSC 70 has completed the handoff back task. Unfortunately, at this point, all of the trunks 130 and 135 are still connected. Moreover, a new trunk 138 has also been connected between the Anchor MSC 70 and the serving MSC 90. The resulting call connection between the telephone 40 and the MS 50 now comprises the series of switches 100 connected by trunks 130 and 135. The telephone 40 is connected to the switches 100 by way of line connection or wireless interface 110, and the MS 50 is connected to the new serving MSC 70 using the wireless network interface 139. The FacilitiesRelease messages 141, 142, and 143 are used in the conventional fashion, along with the FacilitiesRelease responses 144, 145, and 146 to release trunks 130, 135, and 138, which are no longer necessary to maintaining the call path connection between the telephone 40 and the MS 50.

Figure 4:
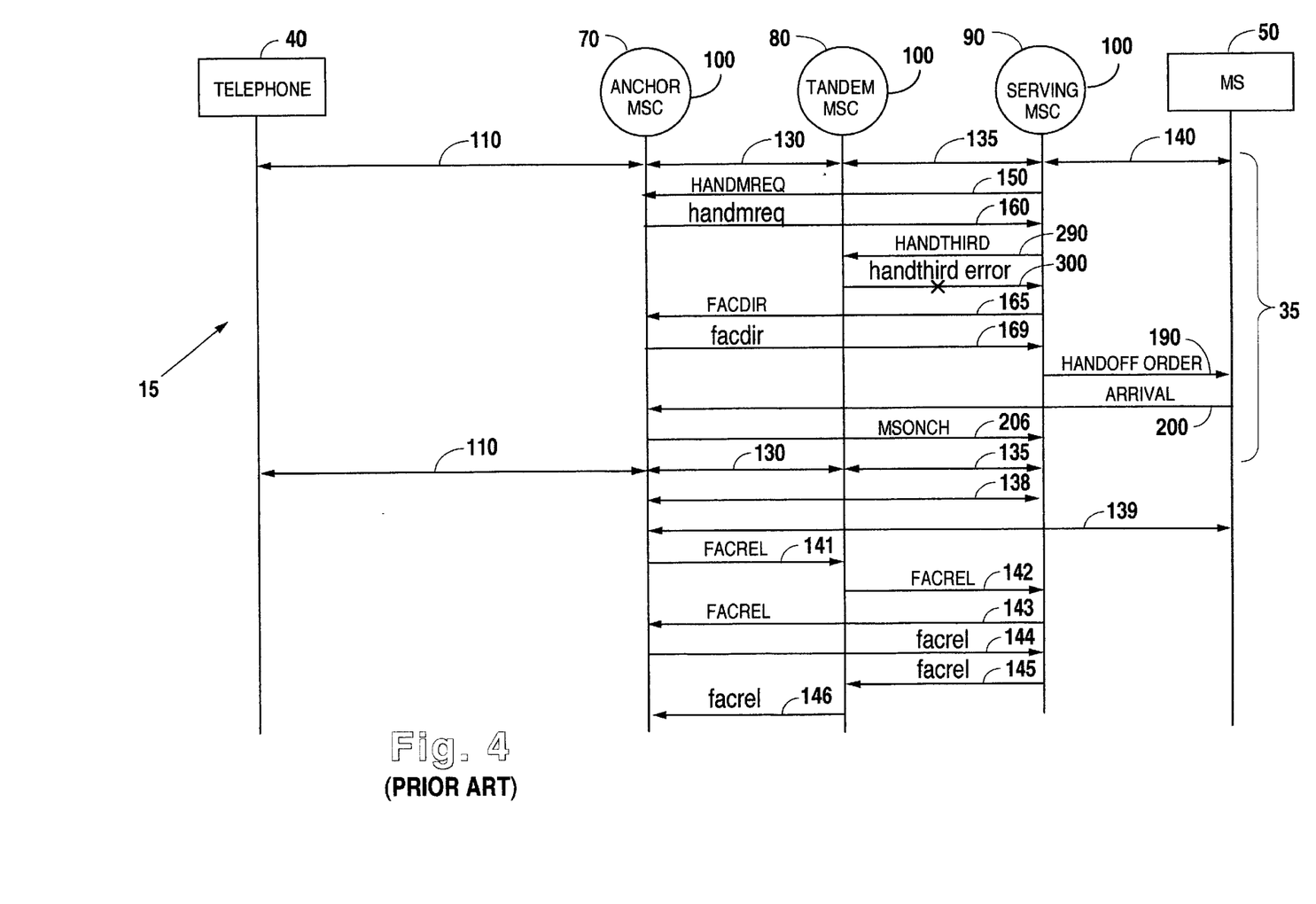
FIG. 4 (previously described) is a network signaling and nodal operation diagram illustrating prior art handoff back operations with message errors.

Referring now to FIG. 4, scenario 35 illustrates what can happen in prior art communications when a HandoffToThird message is sent to a switch which is incapable of accepting the HandoffToThird message for execution. The same result may occur if no response is received to the message due to congestion within the network 15, or for other reasons recognized by those skilled in the art.

In this case, a HandoffMeasurementRequest message 150 is sent from the serving MSC 90 to the Anchor MSC 70 (which is also the desired target switch 70), which elicits a HandoffMeasurementRequest response 160 from the Anchor MSC 70 to the serving MSC 90. The serving MSC 90, in turn, sends a HandoffToThird message 290 to the tandem MSC 80, which is incapable of processing the message 290. As noted above, there may be no response because the tandem MSC 80 does not support the HandoffToThird command, or possibly, because the network 15 is congested. In any event, an error 300 occurs, and the serving MSC 90 receives a response such as RETURN ERROR, REJECT, or no response at all is received (i.e., "NO RESPONSE" means that there is no response and the serving MSC 90 times out).

Since the tandem MSC 80 is incapable of supporting a handoff operation with path minimization (as evidenced by the error message), a FacilitiesDirective message 165 is instead sent from the serving MSC 90 to the Anchor MSC 70, or target MSC 70. Once the Anchor MSC 70 verifies that a designated channel is available for use by the MS 50, a FacilitiesDirective response 169 is sent from the Anchor MSC 70 to the serving MSC 90. This results in a Handoff Order message 190 being sent from the serving MSC 90 to the MS 50 directing movement of the MS 50 onto the designated channel at the target MSC 70. After arrival 200 of the MS 50 on the designated channel at the target MSC 70, the target MSC 70 will send a Mobile Station On Channel message 206 to the serving MSC 90. At this point, the conventional series of FacilitiesRelease messages and facilitiesrelease responses 141–146 are used to release the trunks 130, 135, and 138, from the call path, as they are no longer needed to support communication between the telephone 40 and the MS 50 (now connected by the line connection/interface 110 and the network interface 139. This lengthy series of message interchanges, also required for the scenario described in FIG. 3, is inefficient, and wastes network resources.

Therefore, what is needed is a method to support a handoff back call connection operation within a telecommunications network, including multiple, connected switches, that enables the release of unused trunks along the call path when the target switch is already active within the call path, and not directly connected to the serving switch. This method would be especially useful if the MSCID of an Anchor MSC was made known to the serving MSC prior to initiating handoff operations, so that the served MS could be handed back directly to the Anchor MSC, when the Anchor MSC is also the target MSC. Such a method should be usable within the current ANSI-41D Standard, and also be backward-compatible with previous versions of the standard. Such a method should require no changes in currently-available network switch hardware.

SUMMARY OF THE INVENTION

The method of the present invention operates to enable handoff back operations within a telecommunications network during several different call connection scenarios, with the condition that the target MSC is the same switch as the Anchor MSC. First, when path minimization is possible and the handoff occurs between a serving switch and a target (Anchor) switch, wherein the target switch is already connected within the call path, and is not directly trunk-connected to the serving switch. Second, where call path minimization may be possible, but it is determined that one of the switches in the call path does not support path minimization operations. Finally, when path minimization is not possible, and the handoff occurs between the serving switch and the target switch, as described in the first scenario. In each case, the target MSC is a switch in the call path that has no direct trunk connections to the switch currently serving the MS, and wherein the target MSC is also the Anchor MSC to which the call connection is being handed off.

The method of the present invention makes use of the MSCID for the Anchor MSC contained within the BillingID of a FacilitiesDirective message that the serving MSC receives from the immediately preceding MSC in the call path (i.e., which can be an Anchor MSC, or some other tandem MSC). Since the MSCID for the Anchor (hereinafter the "MSCID-Anchor") is known by the serving MSC, a handoff back operation can be made directly from the serving MSC to the Anchor MSC using the MSCID-Anchor embedded within a conventional ANSI-41 Mobile Application Part (MAP) operation.

The method of the present invention has at least two advantages: first, there are no trunks which must be connected to effect the handoff operation, and second, the standard ANSI-41D handoff back operation may be used with increased utility for this purpose. No change in the method of using the standard handoff back operation is required. Using this method, all of the intervening tandem MSCs in the call path are bypassed, and released in the conventional manner. Essentially, the handoff back operation is forced to operate with the final destination of the call, which turns out to be the Anchor/Target MSC. Since the handoff is made directly back to the Anchor MSC, it is immaterial whether intervening tandem MSCs are able to recognize the handoff back command, or whether path minimization is supported throughout the call path.

DETAILED DESCRIPTION OF PRESENTLY PREFERRED EXEMPLARY EMBODIMENTS

Figure 5:
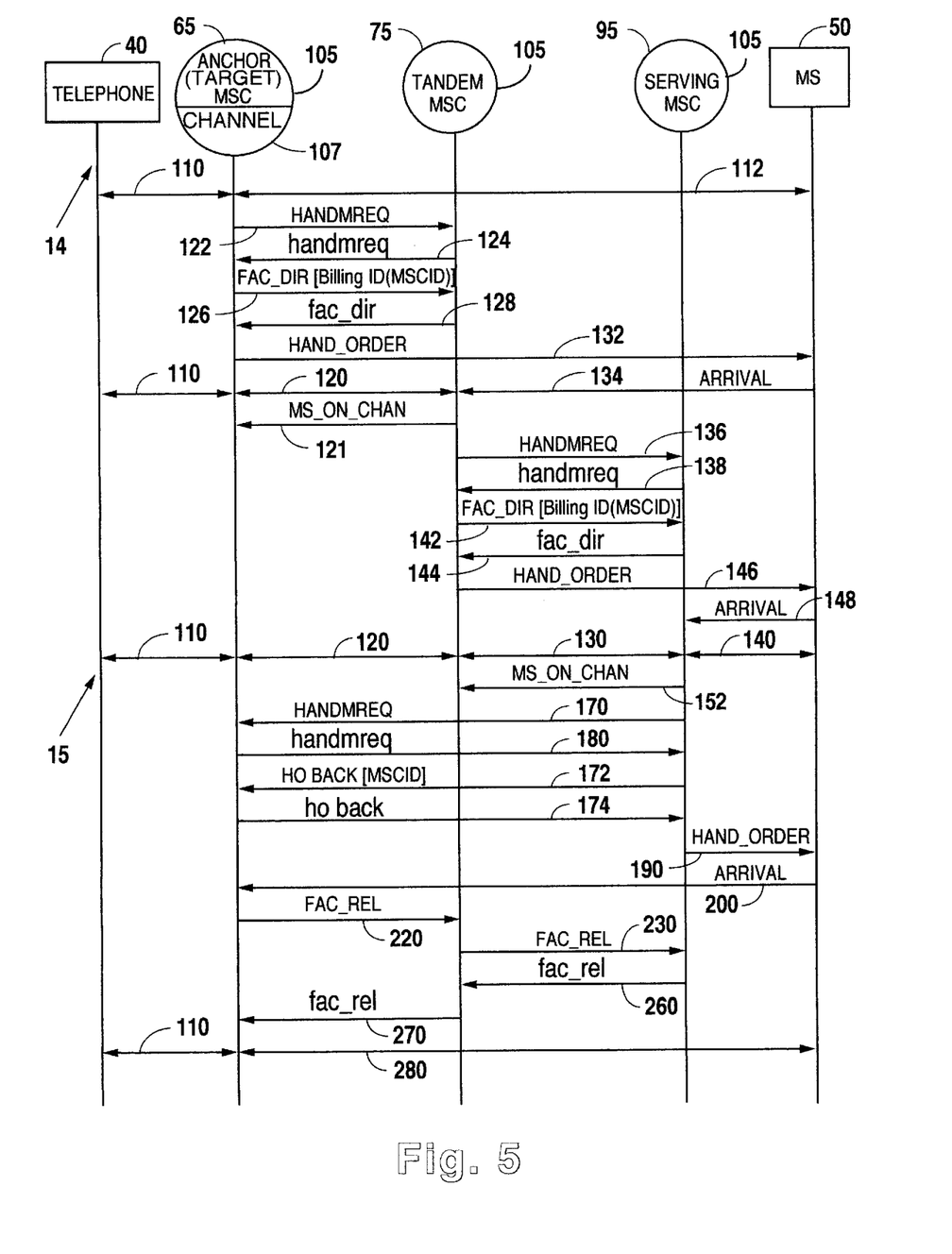
FIG. 5 is a network signaling and nodal operation diagram illustrating the method of the present invention.

Turning now to FIG. 5, the network signaling and nodal operation diagram illustrating the first method of the present invention can be seen. Generally, there is a telecommunications network 15 comprising several switches 105 connected along a call path between a telephone 40 and a Mobile Station 50. For example, the switches 105 may comprise an anchor MSC 65 connected to a tandem MSC 75 by a trunk 120, which is in turn connected to a Serving MSC 95 (SMSC) by a trunk 130. The telephone 40 (which may be a wireline phone, mobile phone, or some other telephonic communication device) is connected by a telephone line 110 (or wireless network interface, etc. as appropriate for the type of device 40) to the anchor MSC 65, and the Mobile Station 50 is connected by a wireless network interface 140 to the serving MSC 95. It should be noted that in every instance where a HandoffBackMessage, a HandoffMeasurementRequest message, a HandoffToThird message, or a FacilitiesDirective message are used, the HandoffBack2, HandoffMeasurementRequest2 message, HandoffToThird2 message, and FacilitiesDirective2 messages may be substituted. This accommodates data service transmissions, which are only supported by the HandoffBack2, HandoffMeasurementRequest2, HandoffToThird2, and FacilitiesDirective2 messages.

Before handoffs of any type occur, the configuration of the telecommunications network comprises the telephone 40 and MS 50 connected to the anchor MSC 65 by way of a telephone line 110 and the wireless network interface 112.

As the MS 50 moves away from the Anchor MSC 65, the configuration of the telecommunications network 14 begins to change. For example, as the MS 50 moves away from the anchor (serving) MSC 65, the Anchor MSC 65 determines if a handoff to an adjacent candidate MSC (eg., the tandem MSC 75) is appropriate. A HandoffMeasurement Request 122 is sent to the candidate MSC 75. The candidate MSC 75 performs location measurement functions and returns the results to the Anchor MSC 65 in a handoffmeasurement response 124. The Anchor MSC 65 determines that the call should be handed off to the candidate (now target) MSC 75. Assuming that either the Anchor MSC 65 or the target MSC 75 do not support a HandoffForThird message, a FACILITIESDIRECTIVE message 126 is sent to the target MSC 75 to initiate a handoff forward operation, verify an available channel at the target MSC 75, and set up a trunk between the Anchor MSC 65 and the target MSC 75.

Assuming that a voice channel is available at the tandem MSC 75, a facilities directive response 128 is sent from the target MSC 75 to the Anchor MSC 65. A trunk 120 is then set up between the Anchor MSC 65 and the target MSC 75. A HANDOFF$_{13}$ ORDER 132 is then sent from the Anchor MSC 65 to the MS 50, and the MS 50 arrives on the available channel at the target MSC 75, such that communication is now established between the telephone 40, the Anchor MSC 65, the trunk 120, the target MSC 75, and the MS 50 via wireless interface 134. The target MSC 75 sends a MOBILEONCHANNEL message 121 to the Anchor MSC 65, which indicates that the target (now serving) MSC has successfully completed the handoff forward process. After reception of the MOBILEONECHANNEL message 121, the handoff forward process is complete.

Similarly, as the MS moves away from the MSC 75 toward the MSC 95, the MSC 75 determines if a handoff to the adjacent candidate MSC (i.e., MSC 95) is appropriate. A HANDOFFMEASUREMENT request 136 is sent to the candidate MSC 95. The candidate MSC 95 performs location measurement functions and returns the result to the MSC 75 in a handoffmeasurement response 138.

Again, the MSC 75 determines that the call should be handed off to the candidate (now target) MSC 95, and a FACILITIESDIRECTIVE message 142 is sent to the target MSC 95 to initiate a handoff forward operation, verify an available channel at the target MSC 95, and set up a trunk 130 between the MSC 75 and the MSC 95.

Assuming that a voice channel is available on the target MSC 95, a facilities directive response is returned from the target MSC 95 to the MSC 75. The trunk 130 is now set up between the MSC 75 and the MSC 95. A HANDOFF_ORDER 146 is sent from the MSC 75 to the MS 50.

The MS 50 arrives on the available channel at the target (now serving) MSC 95, and communication is established between the MS 50 and the telephone 40 by way of the telephone line 110, trunks 120 and 130, and the wireless interface 140. The serving MSC 95 then sends a MOBILEONCHANNEL message 152 to the (now tandem) MSC 75, informing the tandem MSC 75 that the serving MSC 95 has successfully completed the handoff forward process. It should be noted that each time the FACILITIES DIRECTIVE messages 126 and 142 are sent to the next MSC along the call path, the MSCID in the BillingID is also passed along to the new serving MSC. Thus, the identification address of the Anchor MSC 65 (i.e., the MSCID in the BillingID) is always presented to the next MSC along the call path.

The telecommunications network 15 now includes a MS 50 served by a Serving MSC (SMSC) 95, using a wireless network interface 140, connected along the call path to a tandem MSC (TMSC) 75 and an anchor MSC 65. The anchor MSC 65 is connected to the TMSC 75 by a first inter-MSC trunk 120, and the TMSC 75 is connected to the SMSC 95 by a second inter-MSC trunk 130. The anchor MSC 65 includes a designated available channel 107. The handoff back call connection operation illustrated in FIG. 5 occurs from the SMSC 95 to a target switch that does not have a direct trunk connection to the serving SMSC 95, and which is also the Anchor MSC 65.

The method includes the step of determining that a handoff back call connection operation to a target MSC should occur, and that the target MSC is also the Anchor MSC. The target MSC is indeed the Anchor MSC 65 in this case, as verified by the MSCID-Anchor contained in the BillingID parameter of the FacilitiesDirective message 142 sent from the tandem MSC 75 to the serving MSC 95 when the call connection was handed forward from the tandem MSC 75 to the serving MSC 95 (prior to the handoff back determination). Both the FacilitiesDirective message 142 and the facilitiesdirective response 144 occur prior to the determination by the serving MSC 95 that a handoff back operation should occur. That is, by the time the trunk 130 is established, the FacilitiesDirective message 142 and the facilitiesdirective response 144 have been sent and received by the tandem MSC 75. Since the MSCID for the Anchor MSC 65 (which is the first switch in any call connection) is a standard parameter within the BillingID, the MSCID can be compared with the results of handoffmeasurement responses received by its neighbors to determine whether one of the responsive neighbors is indeed the Anchor MSC 65. If the next target MSC address is the same as the MSCID contained in the BillingID, the streamlined handoff back process of the present invention may be implemented.

The next step is verifying that the designated channel 107 of the Anchor MSC 65 is available to support the MS 50. Next, the method involves moving the MS 50 directly to the designated channel 107 of the Anchor MSC 65. The method includes the step of directing the tandem MSC 75 and the serving MSC 95 to release the first and second inter-MSC trunks 120 and 130, respectively. Finally, the method may include the step of marking the first and second inter-MSC trunks 120 and 130 as idle.

The step of determining that the handoff back action to the target MSC 65 (i.e., the Anchor MSC 65) should occur may include the step of sending a HandoffMeasurementRequest message 170 from the serving MSC 95 to the Anchor MSC 65, which is followed by the step of sending a handoffmeasurementrequest response 180 from the Anchor MSC 65 to the serving MSC 95.

Figure 6:
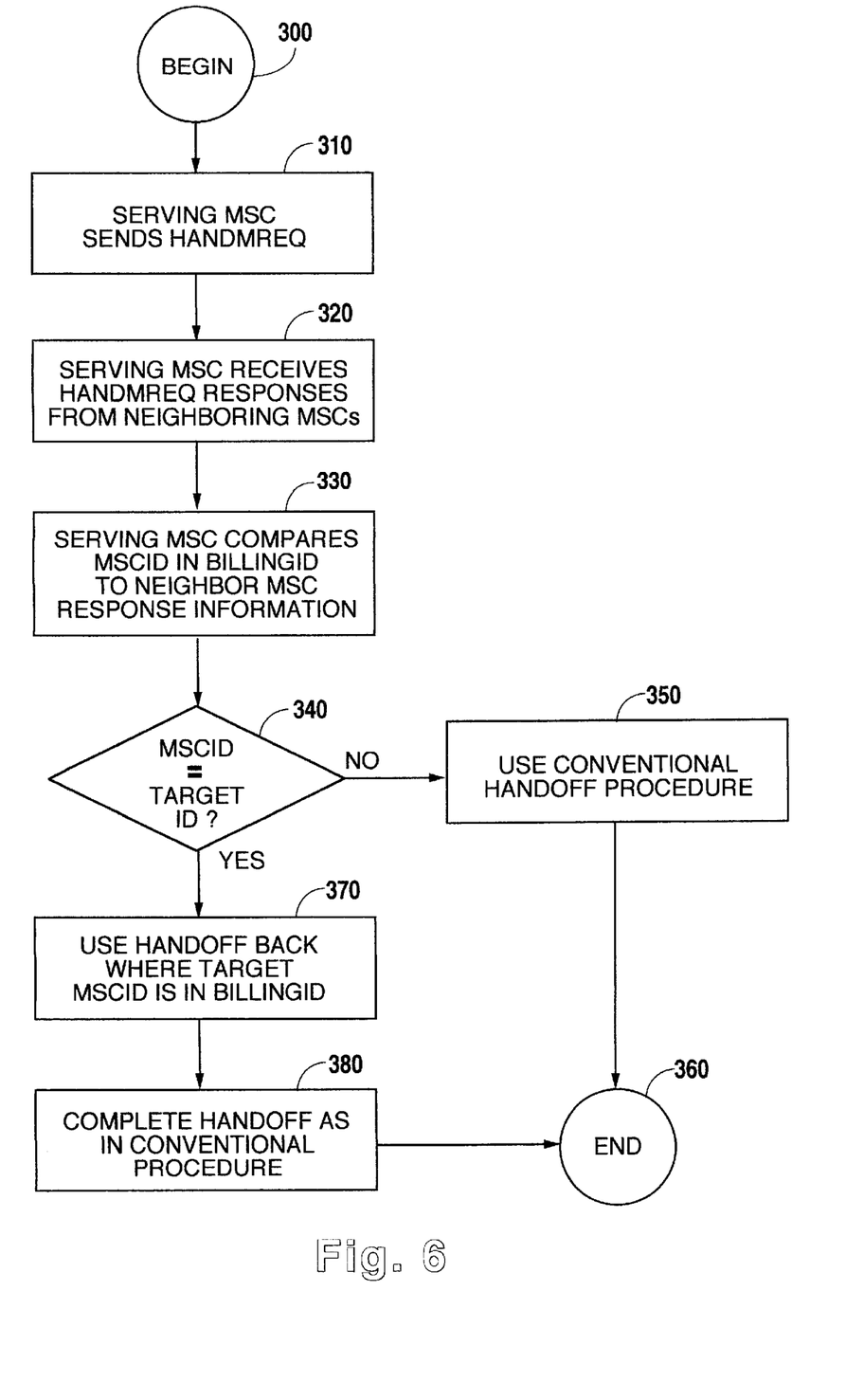
FIG. 6 is a flow chart illustrating a portion of the method of the present invention.

Turning now to FIGS. 5 and 6, an expanded flow chart illustrating a portion of the method of the present invention for handing a connection back to the Anchor MSC 65 (now the target) can be seen. The method begins at step 300, and continues with step 310, wherein the serving MSC 95 sends a HANDOFFMEASUREMENT request 170 to neighboring MSCs in step 310. The serving MSC 95 then receives various handoffmeasurement request responses from neighboring MSCs, including handoffmeasurement request response 180 in step 320. The serving MSC 95 then compares the MSCID in the BillingID (received in the previous FACILITIESDIRECTIVE message 142 from the tandem MSC 75) to the identification number of the target MSC in step 330, which was received as a part of the handoffmeasurement request responses in step 320.

If the MSCID (contained in the BillingID) is not equal to the identification address number for the target MSC as evaluated in step 340, conventional handoff procedures will be used to move the MS 50 from one MSC to the next in step 350. The procedure will then end at step 360.

If on the other hand, the MSCID is equal to the identification number for the target MSC as evaluated in step 340, a conventional HANDOFFBACK message will be sent to the neighboring (now target) MSC in step 370. The handoffback operation will then be completed in step 380 according to conventional ANSI-41 procedures, and the method ends at step 360. Thus, the step of determining from the identification number for the Anchor MSC 65 that the target MSC is the Anchor MSC 65 may include the steps of obtaining an identification number for the target MSC and comparing the identification number for the Anchor MSC 65 with the identification number for the target MSC.

With this explicit view of the handoff back process in mind, and returning to FIG. 5, it can be understood that the serving MSC 95 determines the target for a handoff based on measurements reported by the Anchor MSC 65. The step of verifying that the designated channel 107 of the Anchor MSC 65 is available to support MS 50 includes the step of sending a Handoff Back message 172 along the call path from the serving MSC 95 to the Anchor MSC 65 to direct the Anchor MSC 65 to initiate an intersystem handoff task, and the step of sending a handoff back response 174 from the Anchor MSC 65 to the service MSC 95 to verify the designated channel 107 is available to support the MS 50. The step of moving the MS 50 to the designated channel 107 of the Anchor MSC 65 may include the steps of sending a Mobile Handoff Order message 190 from the serving MSC 95 to the MS 50, and receiving the MS 50 on the designated channel 107 at the arrival step 200. Finally, the step of having the target/Anchor MSC 65 direct the tandem MSC 75 and the serving MSC 95 to release the first and second inter-MSC trunks 120 and 130 may include the steps of sending a FacilitiesRelease message along the call path from the Anchor MSC 65 to the serving MSC 95 (steps 220 and 230), and sending a facilitiesrelease response along the call path from the serving MSC 95 to the Anchor MSC 65 (steps 260 and 270).

At this point, the inter-MSC trunks 120 and 130 have been released. The remaining connections within the network include the telephone line 110 and the wireless network interface 280. No unnecessary inter-MSC trunks remain connected along the call path between the telephone 40 and the MS 50, and no additional trunks are required to move the MS 50 to the Anchor MSC 65.

The method of the present invention is adaptable to at least two other inter-exchange handoff scenarios. As shown in FIGS. 3 and 4, the method of the invention may also be used in the situation where a handoff back with tandem using the FacilitiesDirective message is ordinarily used (when path minimization is not supported), and also where the FacilitiesDirective message is ordinarily used because HandoffToThird messaging fails. As shown in FIG. 5, when the MSCID within the BillingID parameter of the FacilitiesDirective message 142 is received by the serving MSC, the address of the Anchor MSC 65 is readily obtained by the serving MSC. Thus, when the Handoff Measurement Request message 170 is sent from the serving MSC 95 to the Anchor MSC 65, and the handoffmeasurement request response 180 is returned, the Handoff Back message 172 can be sent directly from the serving MSC 95 to the Anchor MSC 65. There is no longer any need to make use of the extra FacilitiesDirective messages required when path minimization is not supported, or when a HandoffToThird message is not recognized. In the method of the present invention, a Handoff Back message is simply sent directly from the serving MSC 95 to the Anchor MSC 65, bypassing the tandem MSC 75, and eliminating the need to deal with a lack of functionality on the part of the tandem MSC 75.

Thus, in FIG. 3 (prior art) after the handoffmeasurement request response 160 is received by the serving MSC 90, the method of the present invention operates to match the MSCID of the Anchor MSC 70 to an MSC identification parameter contained in the handoffmeasurement request response 160. Then, instead of using FACILITIESDIRECTIVE messages such as 165 to effect a handoffback, the serving MSC 90 would simply operate to send a conventional HANDOFFBACK message to the Anchor MSC 70 using the address contained in the MSCID. Similarly, considering the network 15 in FIG. 4 (prior art), after the handoffmeasurementrequest response 160 was received by the serving MSC 90, the MSCID of the Anchor MSC 70 would be compared with the (target) MSC identification received in the response 160. Upon finding a match, the serving MSC 90 would then send a conventional handoffback message to the Anchor MSC 70, including the MSCID, instead of using the HANDOFFTOTHIRD message 290. Thus, the handofftothird error response 300 would never be received by the serving MSC 90.

The method of the present invention may also be extended along a call path containing any number of tandem of MSC switches, such as that illustrated in FIG. 1. For example, if the telecommunications network 10 illustrated in FIG. 1 were used to implement the method of the present invention, the Handoff Back message 163 and handoff back response 167 would be sent directly from the serving MSC 90 to the Anchor MSC 60, and back to the serving MSC 90, respectively. The arrival of the MS 50 at the Anchor MSC 60 would occur after the Handoff Order 190 was given. In this scenario, the FacilitiesRelease message 202 and facilitiesrelease response 204 would be initiated by the Anchor MSC 60, instead of the tandem2 MSC 80. Thus, the Anchor MSC 60 would command the tandem1 MSC 70 to release the trunk 120, then the tandem1 MSC 70 would command the tandem2 MSC 80 to release the trunk 130, and finally, the tandem2 MSC 80 would command the serving MSC 90 to release the trunk 135. The remaining call connection is now between the MS 50 and the telephone 40, both connected directly to the Anchor MSC 60.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method supporting a handoff back call connection operation within a telecommunications network including a Mobile Station (MS) served by a Serving Mobile Switching Center (SMSC) connected along a call path to a Tandem MSC (TMSC) and an Anchor Mobile Switching Center (AMSC), wherein the AMSC is connected to the TMSC by a first inter-MSC trunk and the TMSC is connected to the SMSC by a second inter-MSC trunk, wherein the AMSC includes a designated channel, and wherein the handoff back call connection operation occurs from the SMSC to the AMSC, comprising the steps of:

receiving at the SMSC a message including a BillingID parameter containing an identification number for the AMSC;

determining by the SMSC that the handoff back call connection operation to a Target MSC should occur;

determining from the identification number for the AMSC that the target MSC is the AMSC;

verifying that the designated channel of the AMSC is available to support the MS; and     moving the MS to the designated channel of the MSC by using a handoff back command addressed to the identification number for the AMSC.

2. The method of claim 1, wherein the step of determining from the identification number for the AMSC that the Target MSC is the AMSC includes the steps of:

obtaining an identification number for the Target MSC; and     comparing the identification number for the AMSC with the identification number for the Target MSC.

3. The method of claim 1, wherein the step of verifying that the designated channel of the AMSC is available to support the MS includes the steps of:

sending a Handoff Back message from the SMSC to the AMSC to direct the AMSC to initiate an intersystem handoff task; and     sending a Handoff Back response from the AMSC to the SMSC to verify the designated channel is available to support the MS.

4. The method of claim 1, wherein the step of moving the MS to the designated channel of the MSC includes the steps of:

sending a MobileHandoffOrder message from the SMSC to the MS;

receiving by the AMSC of the MS on the designated channel; and     sending a Mobile Station On Channel message from the AMSC to the SMSC.

5. The method of claim 1, including the step of:

sending a message along the call path from the AMSC to the TMSC and the SMSC directing the TMSC and the SMSC to release the first and second inter-MSC trunks.

6. The method of claim 5, wherein the step of sending a message along the call path from the AMSC to the TMSC and the SMSC directing the TMSC and SMSC to release the first and second inter-MSC trunks includes the steps of:

sending a FacilitiesRelease message along the call path from the AMSC to the TMSC;

sending a FacilitiesRelease message along the call path from the TMSC to the SMSC;

sending a FacilitiesRelease response along the call path from the SMSC to the TMSC; and     sending a FacilitiesRelease response along the call path from the TMSC to the AMSC.

7. A method supporting a handoff back call connection operation within a telecommunications network including a Mobile Station (MS) served by a Serving Mobile Switching Center (SMSC) connected along a call path to a Tandem MSC (TMSC) and an Anchor Mobile Switching Center (AMSC), wherein the AMSC is connected to the TMSC by a first inter-MSC trunk and the TMSC is connected to the SMSC by a second inter-MSC trunk, wherein the AMSC includes a designated channel, and wherein the handoff back call connection operation occurs from the SMSC directly to the AMSC, comprising the steps of:

receiving at the SMSC a message including a BillingID parameter containing an identification number for the AMSC;

determining by the SMSC that the handoff back call connection operation to a Target MSC should occur,     determining from the identification number for the AMSC that the Target MSC is the AMSC;

verifying that the designated channel of the AMSC is available to support the MS;

moving the MS directly to the designated channel of the AMSC; and     directing the TMSC and SMSC to release the first and second inter-MSC trunks.

8. The method of claim 7, wherein the step of determining from the identification number for the AMSC that the Target MSC is the AMSC includes the steps of:

obtaining an identification for the Target MSC; and comparing the identification number for the AMSC with the identification number for the Target MSC.

9. The method of claim 7, wherein the step of verifying that the designated channel of the AMSC is available to support the MS includes the steps of:

sending a Handoff Back message from the SMSC to the AMSC to direct the MSC to initiate an intersystem handoff task; and     sending a Handoff Back response from the AMSC to the SMSC to verify the designated channel is available to support the MS.

10. The method of claim 7, wherein the step of moving the MS to the designated channel of the AMSC includes the steps of:

sending a Mobile Handoff Order message from the SMSC to the MS;

receiving the MS on the designated channel; and sending a Mobile Station On Channel message from the AMSC to the SMSC.

11. The method of claim 7, wherein the step of directing the TMSC and SMSC to release the first and second inter-MSC trunks includes the steps of:

sending a Facilities Release message along the call path from the AMSC to the TMSC;

sending a Facilities Release message along the call path from the TMSC to the SMSC;

sending a FacilitiesRelease response along the call path from the SMSC to the TMSC; and     sending a Facilities Release response along the call path from the TMSC to the AMSC.

12. A method supporting a handoff back call connection operation within a telecommunications network including a Mobile Station (MS) served by a Serving Mobile Switching Center (SMSC) connected along a call path to a Tandem MSC (TMSC) and an Anchor Mobile Switching Center (AMSC) which is unable to support path minimization, wherein the AMSC is connected to the TMSC by a first inter-MSC trunk and the TMSC is connected to the SMSC by a second inter-MSC trunk, wherein the AMSC includes a designated channel, and wherein the handoff back call connection operation occurs from the SMSC to the AMSC, comprising the steps of:

receiving at the SMSC a message including BillingID parameter containing an identification number for the AMSC;

determining by the SMSC that the handoff back call connection operation to a Target MSC should occur;

determining from the identification number for the AMSC that the Target MSC is the AMSC;

verifying that the designated channel of the AMSC is available to support the MS; and moving the MS to the designated channel of the MSC by using a handoff back command addressed to the identification number for the AMSC.

13. The method of claim 12, wherein the step of determining from the identification number for the AMSC that the Target MSC is the AMSC includes the steps of:

obtaining an identification number for the Target MSC; and comparing the identification number for the AMSC with the identification number for the Target MSC.

14. The method of claim 12, wherein the step of verifying that the designated channel of the AMSC is available to support the MS includes the steps of:

sending a Handoff Back message from the SMSC to the AMSC to direct the AMSC to initiate an intersystem handoff task; and sending a Handoff Back response from the AMSC to the SMSC to verify the designated channel is available to support the MS.

15. The method of claim 12, wherein the step of moving the MS to the designated channel of the MSC includes the steps of:

sending a MobileHandoffOrder message from the SMSC to the MS;

receiving by the AMSC of the MS on the designated channel; and sending a Mobile Station On Channel message from the AMSC to the SMSC.

16. The method of claim 12, including the step of:

sending a message along the call path from the AMSC to the TMSC and the SMSC directing the TMSC and the SMSC to release the first and second inter-MSC trunks.

17. The method of claim 16, wherein the step of sending a message along the call path from the AMSC to the TMSC and the SMSC directing the TMSC and SMSC to release the first and second inter-MSC trunks includes the steps of:

sending a FacilitiesRelease message along the call path from the AMSC to the TMSC;

sending a FacilitiesRelease message along the call path from the TMSC to the SMSC;

sending a FacilitiesRelease response along the call path from the SMSC to the TMSC; and sending a FacilitiesRelease response along the call path from the TMSC to the AMSC.

18. A method supporting a handoff back call connection operation within a telecommunications network including a Mobile Station (MS) served by a Serving Mobile Switching Center (SMSC) connected along a call path to a Tandem MSC (TMSC) which is unable to accept a HandoffToThird message for execution, and an Anchor Mobile Switching Center (AMSC), wherein the AMSC is connected to the TMSC by a first inter-MSC trunk and the TMSC is connected to the SMSC by a second inter-MSC trunk, wherein the AMSC includes a designated channel, and wherein the handoff back call connection operation occurs from the SMSC to the AMSC, comprising the steps of:

receiving at the SMSC a message including a BillingID parameter message containing an identification number for the AMSC;

determining by the SMSC that the handoff back call connection operation to a Target MSC should occur;

determining from the identification number for the AMSC that the Target MSC is the AMSC;

verifying that the designated channel of the AMSC is available to support the MS; and moving the MS to the designated channel of the MSC by using a handoff back command addressed to the identification number for the AMSC.

19. The method of claim 18, wherein the step of determining from the identification number for the AMSC that the Target MSC is the AMSC includes the steps of:

obtaining an identification number for the TargetMSC; and comparing the identification number for the AMSC with the identification number for the Target MSC.

20. The method of claim 18, wherein the step of verifying that the designated channel of the AMSC is available to support the MS includes the steps of:

sending a Handoff Back message from the SMSC to the AMSC to direct the AMSC to initiate an intersystem handoff task; and sending a Handoff Back response from the AMSC to the SMSC to verify the designated channel is available to support the MS.

21. The method of claim 18, wherein the step of moving the MS to the designated channel of the MSC includes the steps of:

sending a MobileHandoffOrder message from the SMSC to the MS;

receiving by the AMSC of the MS on the designated channel; and sending a Mobile Station On Channel message from the AMSC to the SMSC.

22. The method of claim 18, including the step of:

sending a message along the call path from the AMSC to the TMSC and the SMSC directing the TMSC and the SMSC to release the first and second inter-MSC trunks.

23. The method of claim 22, wherein the step of sending a message along the call path from the AMSC to the TMSC and the SMSC directing the TMSC and SMSC to release the first and second inter-MSC trunks includes the steps of:

sending a FacilitiesRelease message along the call path from the AMSC to the TMSC;

sending a FacilitiesRelease message along the call path from the TMSC to the SMSC;

sending a FacilitiesRelease response along the call path from the SMSC to the TMSC; and sending a FacilitiesRelease response along the call path from the TMSC to the AMSC.

* * * * *

UNITED STATES PATENT AND TRADEMARK OFFICE
CERTIFICATE OF CORRECTION

PATENT NO. : 6,577,867 B1
DATED : June 10, 2003
INVENTOR(S) : Alejandro A. Elizondo It is certified that error appears in the above-identified patent and that said Letters Patent is hereby corrected as shown below:

Column 7,
Line 26, replace "A HANDOFF$_{13}$ ORDER 132" with -- A HANDOFF_ORDER 132 --

Column 12,
Line 10, replace "should occur," with -- should occur; --

Signed and Sealed this

Twenty-fifth Day of May, 2004

JON W. DUDAS
*Acting Director of the United States Patent and Trademark Office*